(12) United States Patent
Guerra

(10) Patent No.: US 11,140,822 B2
(45) Date of Patent: Oct. 12, 2021

(54) ROTARY HEAD FOR BRUSH CUTTERS

(71) Applicant: FLASHCUTTER S.R.L. CON UNICO SOCIO, Correggio (IT)

(72) Inventor: Lauro Guerra, Correggio (IT)

(73) Assignee: FLASHCUTTER S.R.L. CON UNICO SOCIO, Correggio (IT)

( * ) Notice: Subject to any disclaimer, the term of this patent is extended or adjusted under 35 U.S.C. 154(b) by 0 days.

(21) Appl. No.: 16/783,869

(22) Filed: Feb. 6, 2020

(65) Prior Publication Data

US 2020/0253117 A1 Aug. 13, 2020

(30) Foreign Application Priority Data

Feb. 7, 2019 (IT) .................. 102019000001785

(51) Int. Cl.
*A01D 34/81* (2006.01)
*A01D 34/73* (2006.01)
*A01D 34/90* (2006.01)

(52) U.S. Cl.
CPC .......... *A01D 34/81* (2013.01); *A01D 34/733* (2013.01); *A01D 34/736* (2013.01); *A01D 34/90* (2013.01)

(58) Field of Classification Search
CPC .... A01D 34/81; A01D 34/733; A01D 34/736; A01D 34/90
See application file for complete search history.

(56) References Cited

U.S. PATENT DOCUMENTS

| 5,544,417 A * | 8/1996 | Atos | A01D 34/4165 30/276 |
| 7,614,153 B2 * | 11/2009 | Guerra | A01D 34/733 30/276 |
| 9,693,500 B2 * | 7/2017 | Guenther | A01D 34/4165 |
| 10,130,029 B2 * | 11/2018 | Pellenc | A01D 34/4161 |
| 10,779,466 B2 * | 9/2020 | Gunther | A01D 34/736 |
| 2007/0180706 A1 * | 8/2007 | Guerra | A01D 34/733 30/276 |
| 2016/0106034 A1 * | 4/2016 | Arnetoli | A01D 34/4166 30/276 |
| 2016/0183452 A1 * | 6/2016 | Kullberg | A01D 34/416 30/276 |
| 2018/0153099 A1 * | 6/2018 | Hwang | A01D 34/736 |
| 2018/0220583 A1 * | 8/2018 | Gunther | A01D 34/4165 |
| 2020/0037503 A1 * | 2/2020 | Kumar | A01D 34/81 |
| 2020/0084962 A1 * | 3/2020 | Yuan | A01D 34/90 |
| 2020/0236847 A1 * | 7/2020 | Nolin | A01D 34/416 |

FOREIGN PATENT DOCUMENTS

| CN | 105706622 A | 6/2016 |
| EP | 2936960 A1 | 10/2015 |
| WO | WO2014041316 A1 | 3/2014 |

OTHER PUBLICATIONS

Italian Search Report and Written Opinion issued by Ministero dello Sviluppo Economico for Italian Application No. IT201900001785, dated Oct. 1, 2019, pp. 1-7.

* cited by examiner

*Primary Examiner* — Omar Flores Sanchez
(74) *Attorney, Agent, or Firm* — The Belles Group, P.C.

(57) ABSTRACT

A rotary head for brush cutters with a lower shell on which cutting means and a ring nut are hinged, the latter being coupled to the lower shell and movable in relation to the lower shell from a first working configuration to a second blade-change working configuration, and vice versa; the rotary head having positioning means for interference fitting said ring nut in a predetermined angular position relative to said lower shell.

14 Claims, 16 Drawing Sheets

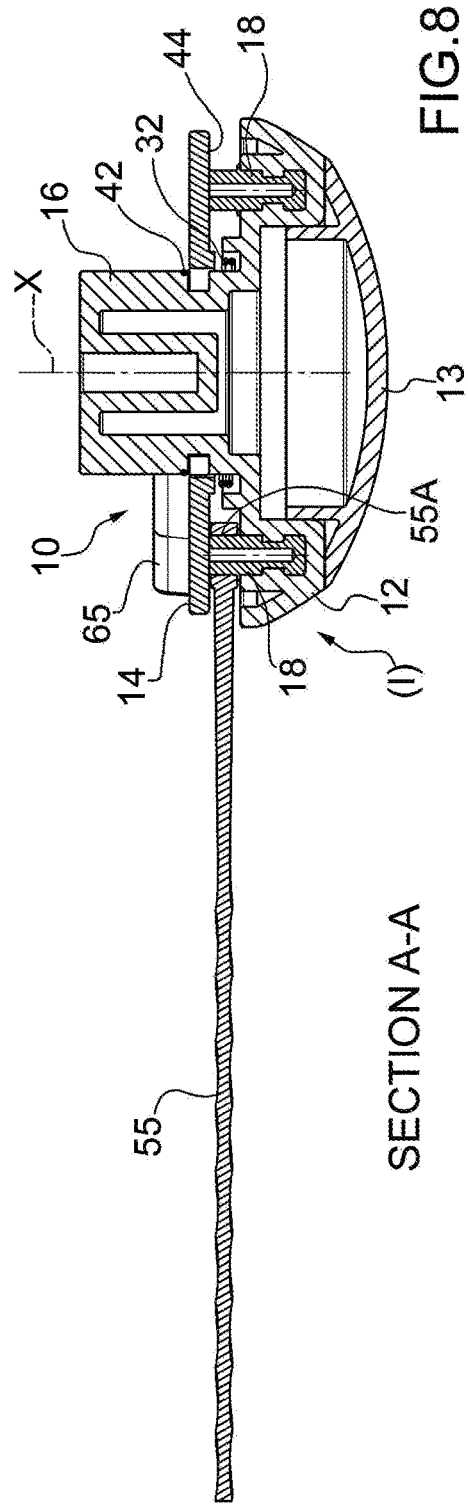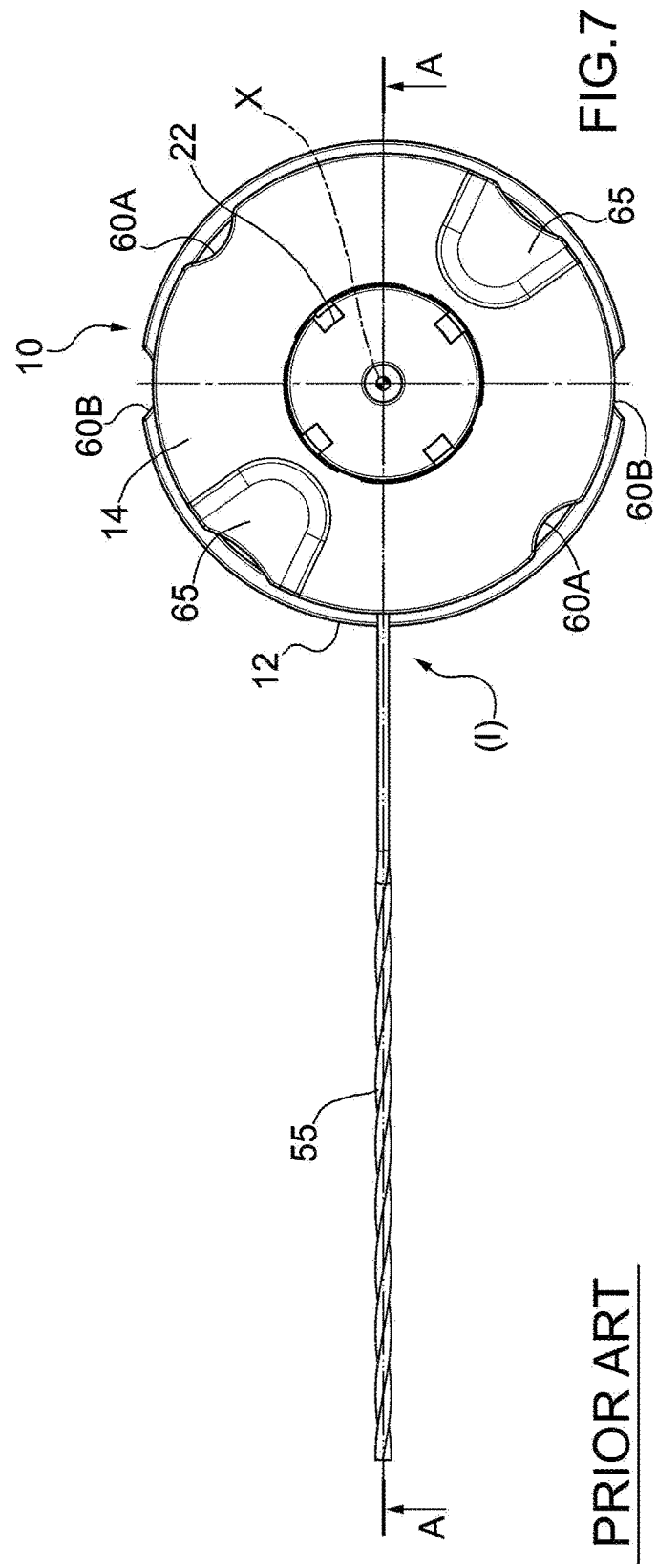

SECTION B-B

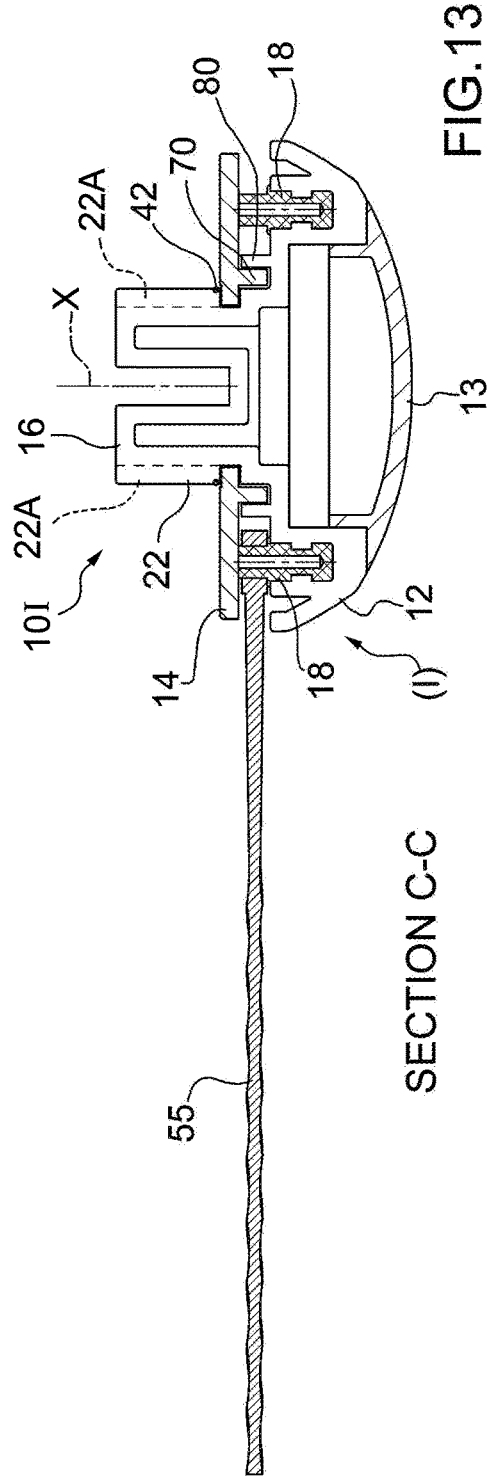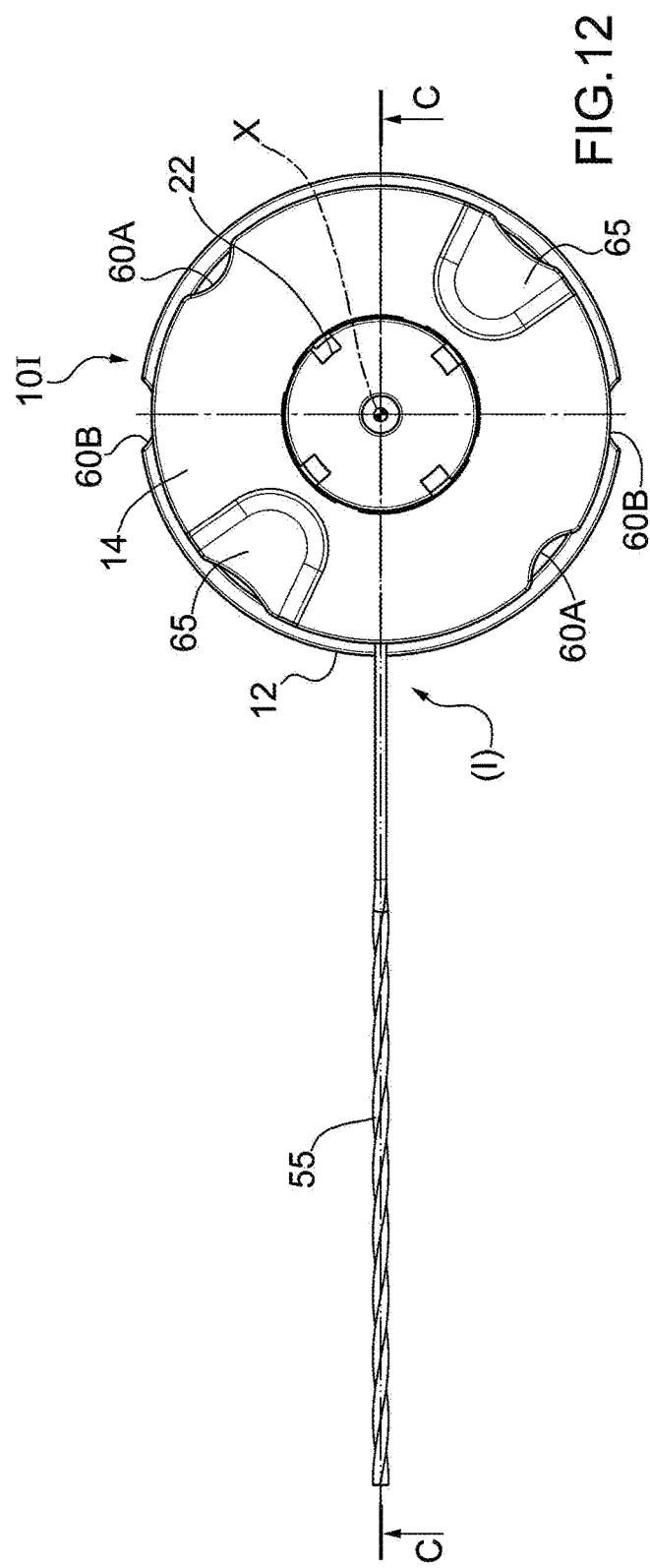

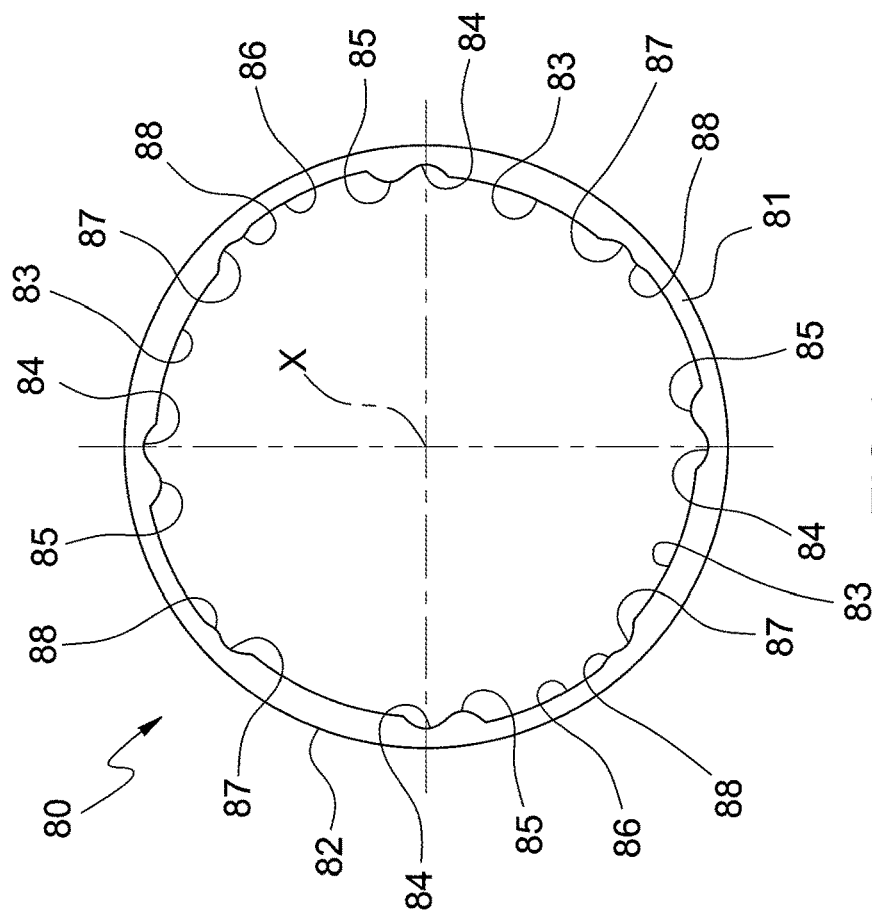
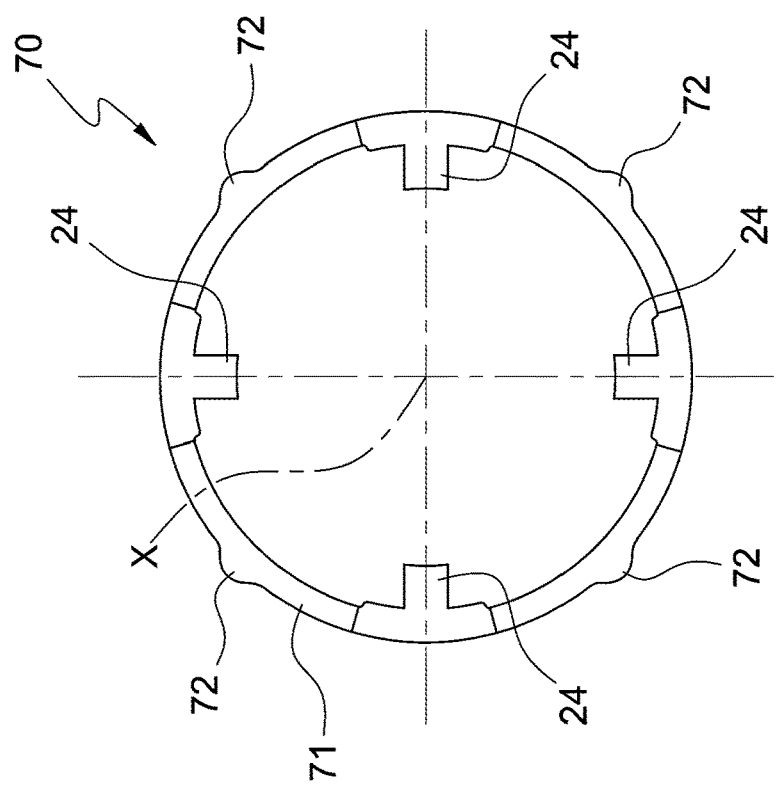
FIG.15
FIG.14

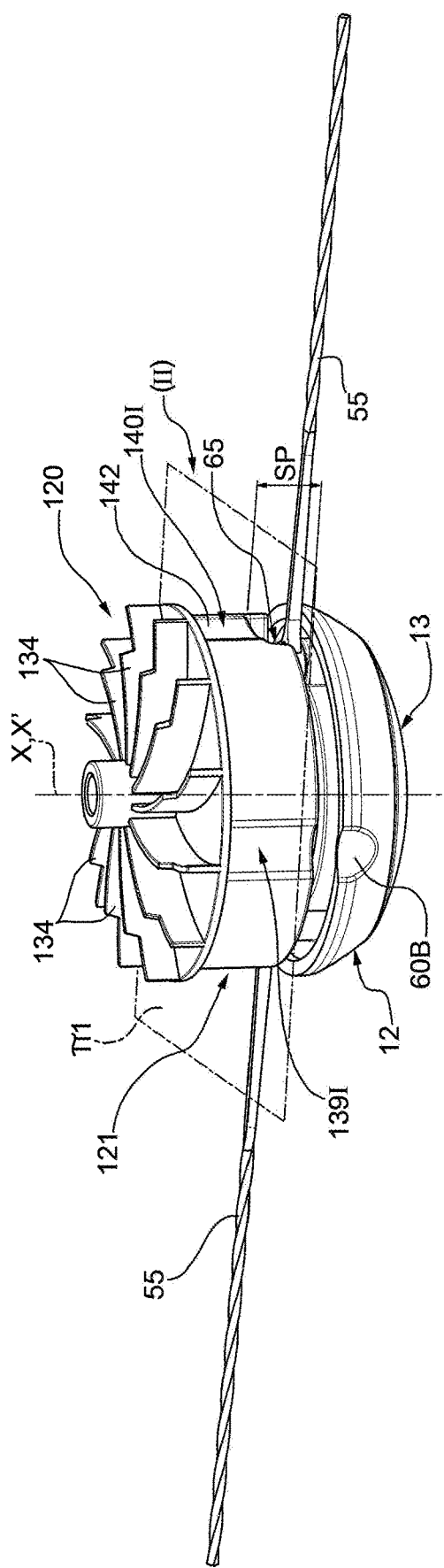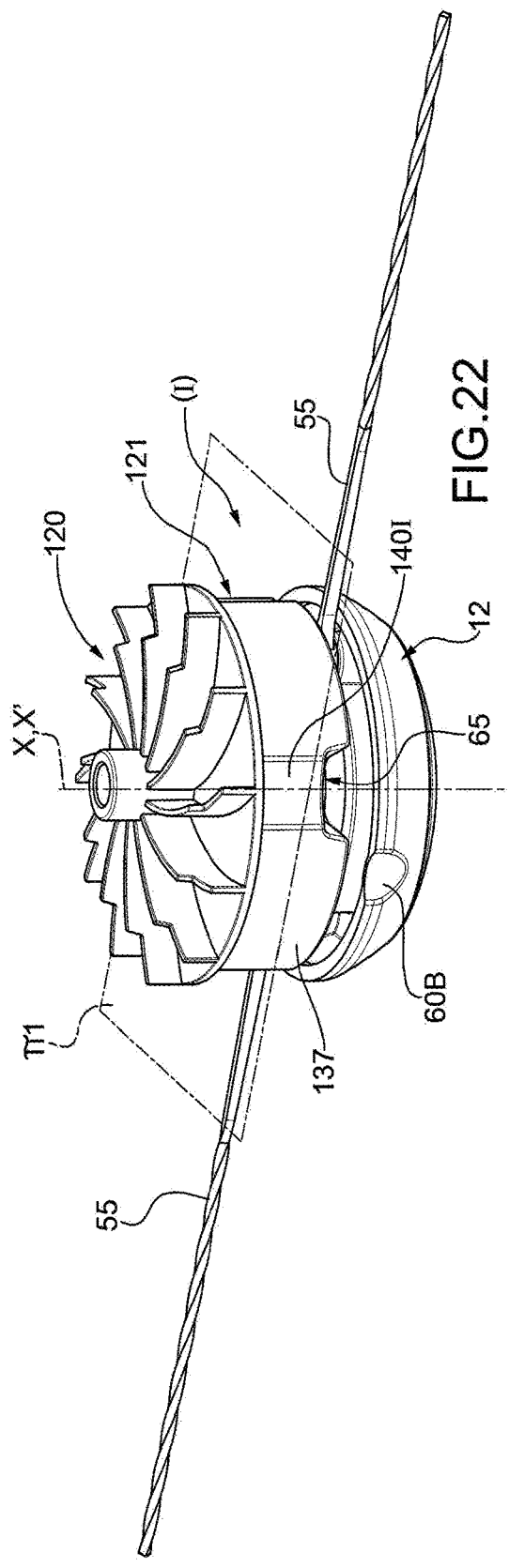

ROTARY HEAD FOR BRUSH CUTTERS

CROSS-REFERENCE TO RELATED APPLICATIONS

This application is related to Italian Patent Application No. 102019000001785 filed on Feb. 7, 2019, the disclosure of which is incorporated by reference.

TECHNICAL FIELD

This invention relates to a rotary head for brush cutters.

More specifically, this invention refers to that type of brush cutter in which the rotary head is provided with several cutting blades hinged with a respective eyelet to the head itself, in angularly equidistant positions, so that during the operation of the brush cutter each blade can oscillate and rotate about its corresponding hinge axis, which is, moreover, parallel to the rotation axis of the rotary head.

BACKGROUND ART

The number of rotating cutting blades normally ranges between 2 and 4.

When you want to change a blade, e.g. because it is worn or damaged, you normally need to use a tool (normally a screwdriver) to unscrew the screw-pin corresponding to that blade.

In doing so, you must take care not to lose the nut, as well as the screw and the washer that is normally placed under the head of the screw.

Since the brush cutter is used on grassy or bushy ground, if one of the above elements falls by chance, it can be difficult to find it again.

Once one of the screw-pins has been removed, the worn blade can be replaced with a new blade, into the hinge eyelet of which the same screw-pin is inserted. The new blade is then inserted into a corresponding hole provided in the head (not forgetting the washer), finally screwing the screw-pin into its nut (normally contained in a recess in the head, which prevents it from rotating). After this, the brush cutter can resume operating.

Therefore, the rotary heads currently on the market are difficult to dismantle/assemble for blade changes.

The head described in U.S. Pat. No. 7,878,097 B1, and in the embodiment illustrated in these FIGS. 1-11 that represent a possible variant thereof, was devised in order to overcome the above-mentioned problems.

For example, in the embodiment shown in these FIGS. 1-11, which is not part of this invention, a rotary head for brush cutters, of the hinged blade type, and comprising a lower shell and an upper ring nut, is described and illustrated.

The upper ring nut comprises at least one concave portion in the form of a tunnel that is closed at one end.

When the rotary head is in a blade change configuration, and, therefore, when the concave portion is also in this blade change configuration, a defined space is created between the upper ring nut and the lower shell, below the concave portion, to enable the manual lifting and removal of a worn blade so as to replace it with a new blade.

However, both the solutions described and illustrated in U.S. Pat. No. 7,878,097 B1 and in FIGS. 1-11 attached herein require the use of coil springs that can easily break during the head's operation.

The technical problem to be solved thanks to this invention consists, therefore, in the provision of a rotary head for a brush cutter, of the type with hinged blades, for which it is easy to replace a blade once it is worn or broken, which does not have coil springs, and for which there is no need to use special tools.

DISCLOSURE OF INVENTION

According to this invention, therefore, a rotary head for a brush cutter is provided according to what is claimed in claim 1, or in any one of the claims that depends, directly or indirectly, on claim 1.

BRIEF DESCRIPTION OF THE DRAWINGS

For a better understanding of this invention, reference will be made to the following attached drawings:

FIG. 7 illustrates a view from above of the rotary head in FIG. 6;

FIG. 8 shows a cross-section A-A performed on the view from above in FIG. 7;

FIG. 12 shows a view from above of a first embodiment of a rotary head for brush cutter manufactured according to the precepts of this invention;

FIG. 13 illustrates a cross-section C-C performed on the view from above in FIG. 12;

FIG. 14 shows a first detail, enlarged, of the rotary head in FIG. 12;

FIG. 15 illustrates a second detail, enlarged, of the rotary head in FIG. 12;

FIG. 20 is a perspective view of the rotary head in a working configuration;

FIG. 22 is a perspective view of the rotary head in an additional working configuration; and, FIG. 23 is a cross-section, enlarged, along the plane π1 in FIG. 22.

BEST MODE FOR CARRYING OUT THE INVENTION

Figure 1:
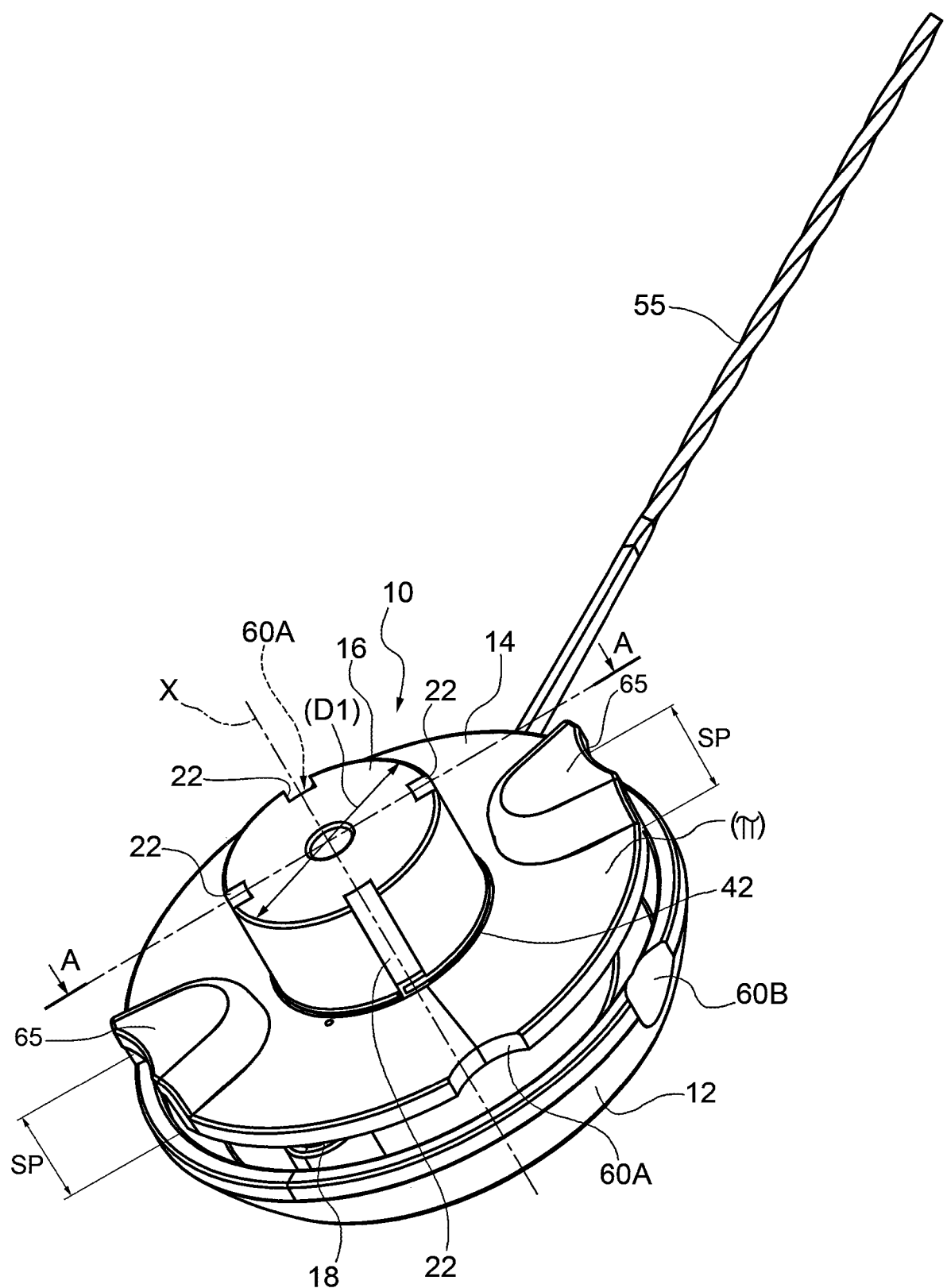
FIG. 1 illustrates a perspective view of a generic rotary head of the multi-blade type; this rotary head is not part of this invention.
Figure 2:
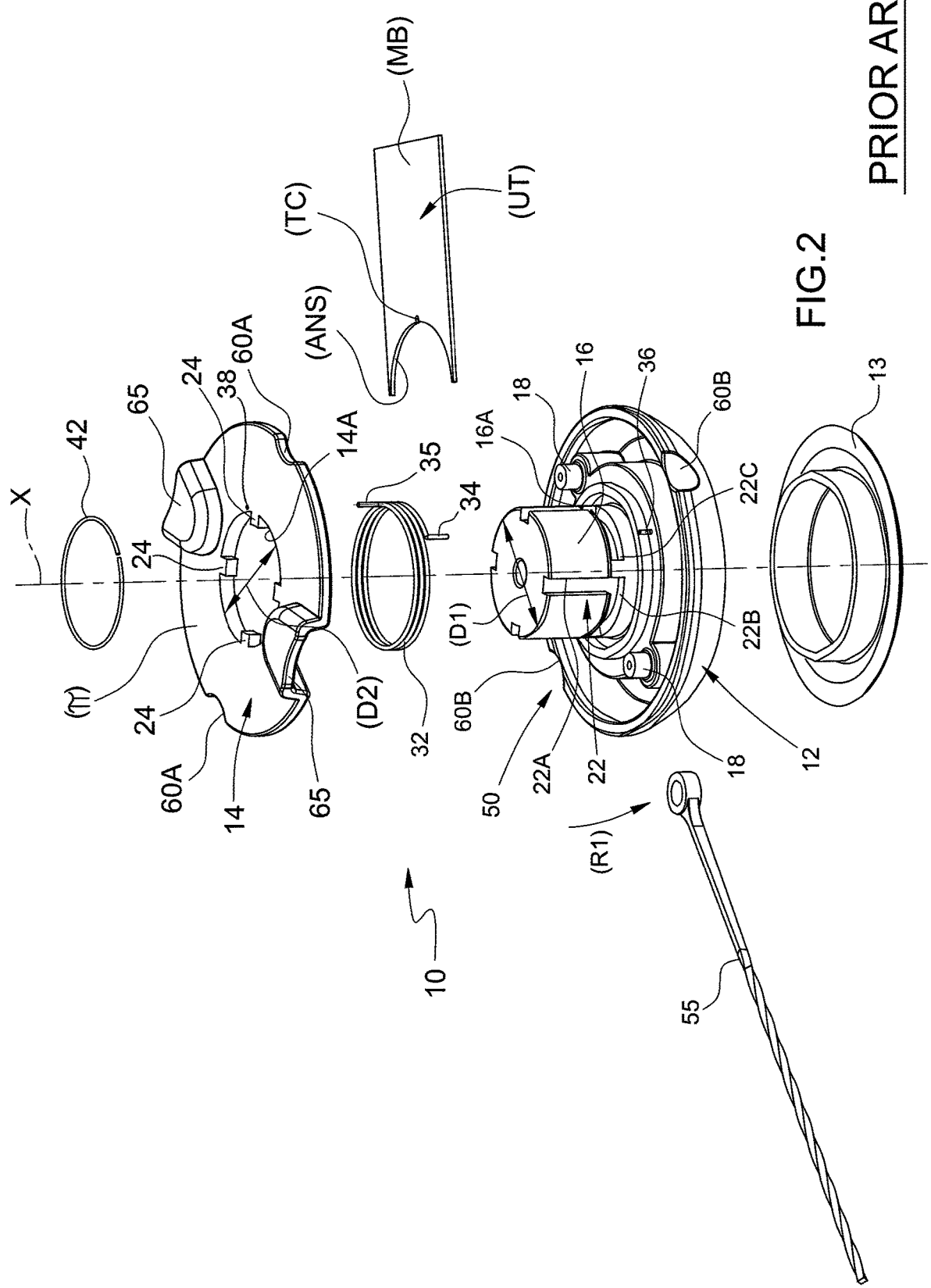
FIG. 2 shows an exploded view of the rotary head in FIG. 1.

In FIGS. 1 and 2, the reference number 10 indicates, as a whole, a generic rotary head of the multi-blade type.

The rotary head 10 for brush cutter has, as a whole, a disc shape, and is of the type compatible with hinged cutting blades 55 and comprises, as main elements, a lower shell 12 and an upper ring nut 14.

The lower shell 12 is closed by an interlocking, hemispherical cap 13 (FIG. 2). The lower shell 12 can be fixed in a known way to the drive shaft (not shown) of the brush cutter, the axis of this shaft having been indicated with X and coinciding with the rotation axis of the head 10.

In addition, the lower shell 12 has a cylindrical hub 16 (diameter (D1)) extending upwards, as well as two fixed pins 18 also facing upwards, arranged at an angle of 180° to each other.

These two fixed pins 18 have the same radial distance from the axis X; in addition, each fixed pin 18 has an axis parallel to the axis X itself.

As shown in more detail in FIG. 2, on the cylindrical side surface of the hub 16, there are four grooves, angularly equidistant by 90°, indicated with 22, and having the typical L-shape of the grooves used in bayonet couplings.

In particular, each groove 22 has a first vertical section 22A, substantially parallel to the above-mentioned axis X, followed by a second horizontal section 22B with an arc shape (FIG. 2).

As illustrated in FIG. 2, the upper ring nut 14 has four radial teeth 24 facing the axis X and angularly equidistant by 90° to each other inside a central through hole 14A.

It should be noted that the diameter (D2) of the central through hole 14A made in the upper ring nut 14 is basically equal to the above-mentioned diameter (D1) of the cylindrical hub 16 (FIG. 2).

The set of grooves 22 and radial teeth 24 forms a bayonet coupling device 50 between the upper ring nut 14 and the cylindrical hub 16.

In fact, as we will see, each tooth 24 is coupled with a corresponding groove 22.

Figure 3:
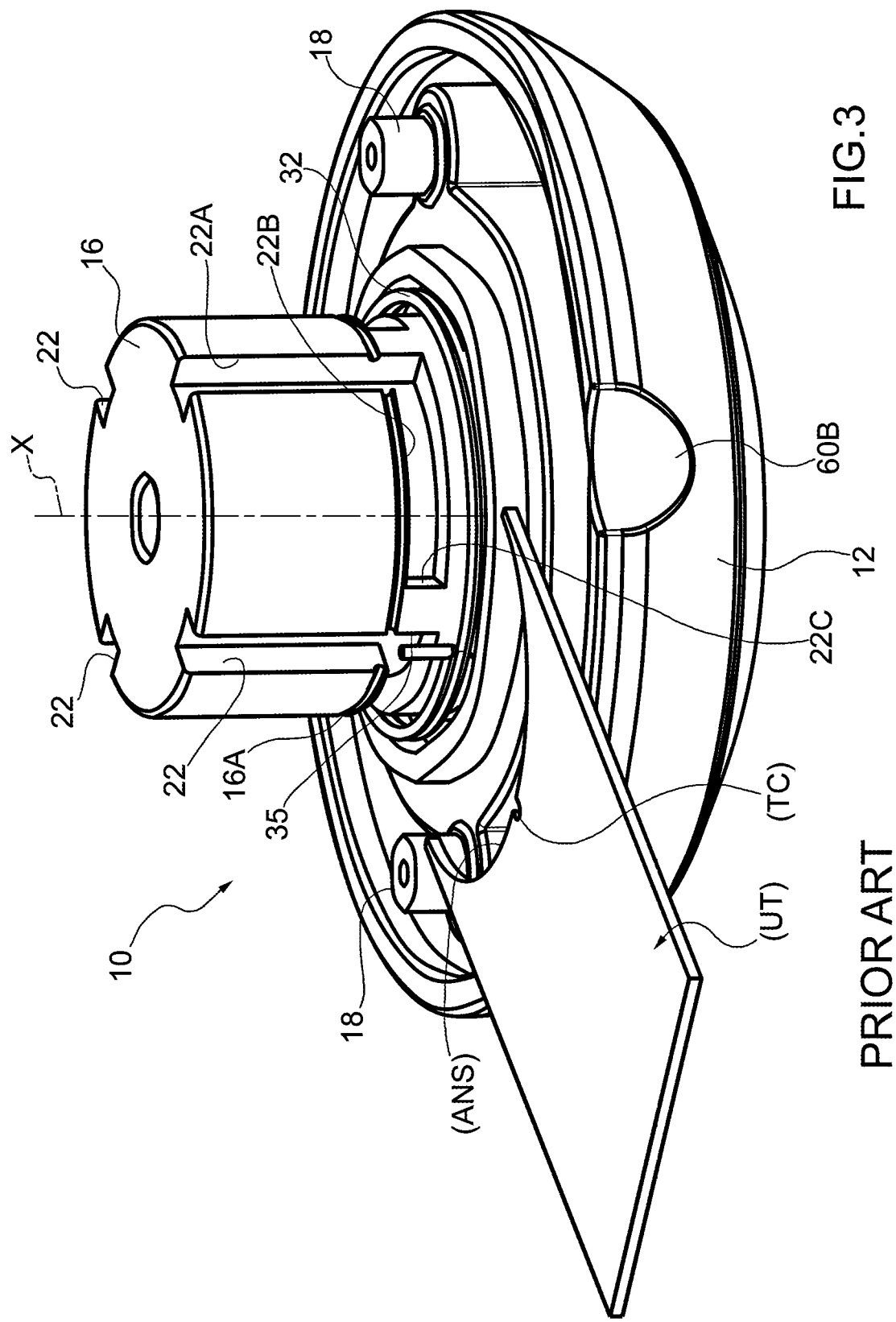
FIG. 3 illustrates a first coil spring loading step, the spring being a construction element of the rotary head shown in FIGS. 1, 2.

Each second horizontal section 22B of each groove is closed by a visible, end-stop abutment 22C, for example, in FIGS. 2 and 3.

As we will see, once the assembly of the head 10 is finished, a corresponding radial tooth 24 is placed on each end-stop abutment 22C.

From the attached figures it can also be seen that the upper ring nut 14 is provided with two gripping slots 60A, that are opposite each other (i.e. arranged at 180° to each other), to facilitate the gripping thereof with the hand when replacing at least one blade 55 (see below).

The upper ring nut 14 is also equipped with two concave portions 65 in the shape of a tunnel closed at one end, and lifted in relation to a resting plane ($\pi$) for the rest of the upper ring nut 14. In this regard, see FIG. 5 in particular.

The two concave portions 65 are also opposite each other (i.e. at 180° to each other).

The lower shell 12 is provided with two gripping slots 60B, that are opposite each other (i.e. arranged at 180° to each other), to facilitate the gripping thereof with the hand when replacing at least one blade 55 (see below).

As we shall see, an elastic medium 32, consisting of a coil spring 32, which works by torsion, enables each radial tooth 24 to be held against a corresponding end-stop abutment 22C belonging to the horizontal section 22B of the corresponding grooves 22, so that the upper ring nut 14 cannot be accidentally disengaged from the lower shell 12 when the brush cutter is not working. When the brush cutter is working there is no possibility of its being disengaged, since the orientation of the horizontal section 22B of the grooves 22 is chosen so that, when the head 10 rotates (in the direction indicated by the arrow (R1) in FIG. 2), each radial tooth 24 is kept pushed against the corresponding end-stop abutment 22C (FIG. 3).

The coil spring 32, which is wound around the cylindrical hub 16, has a bent lower end section 34 designed for being manually inserted by the operator into a seat 36 (FIG. 2) provided in the lower shell 12, as well as a bent upper end section 35 that can be inserted, in use, into a corresponding seat 38 made on the upper ring nut 14 (FIG. 2).

The rotary head 10 is completed by a cut-out elastic ring 42 (FIGS. 6, 8, 9, 11, 13), which is housed in a seat 16A made on the external surface of the cylindrical hub 16 and above the horizontal sections 22B.

The cut-out elastic ring 42 has the function of a retaining and safety element to prevent the separation of the upper ring nut 14 from the lower shell 12.

Figure 4:
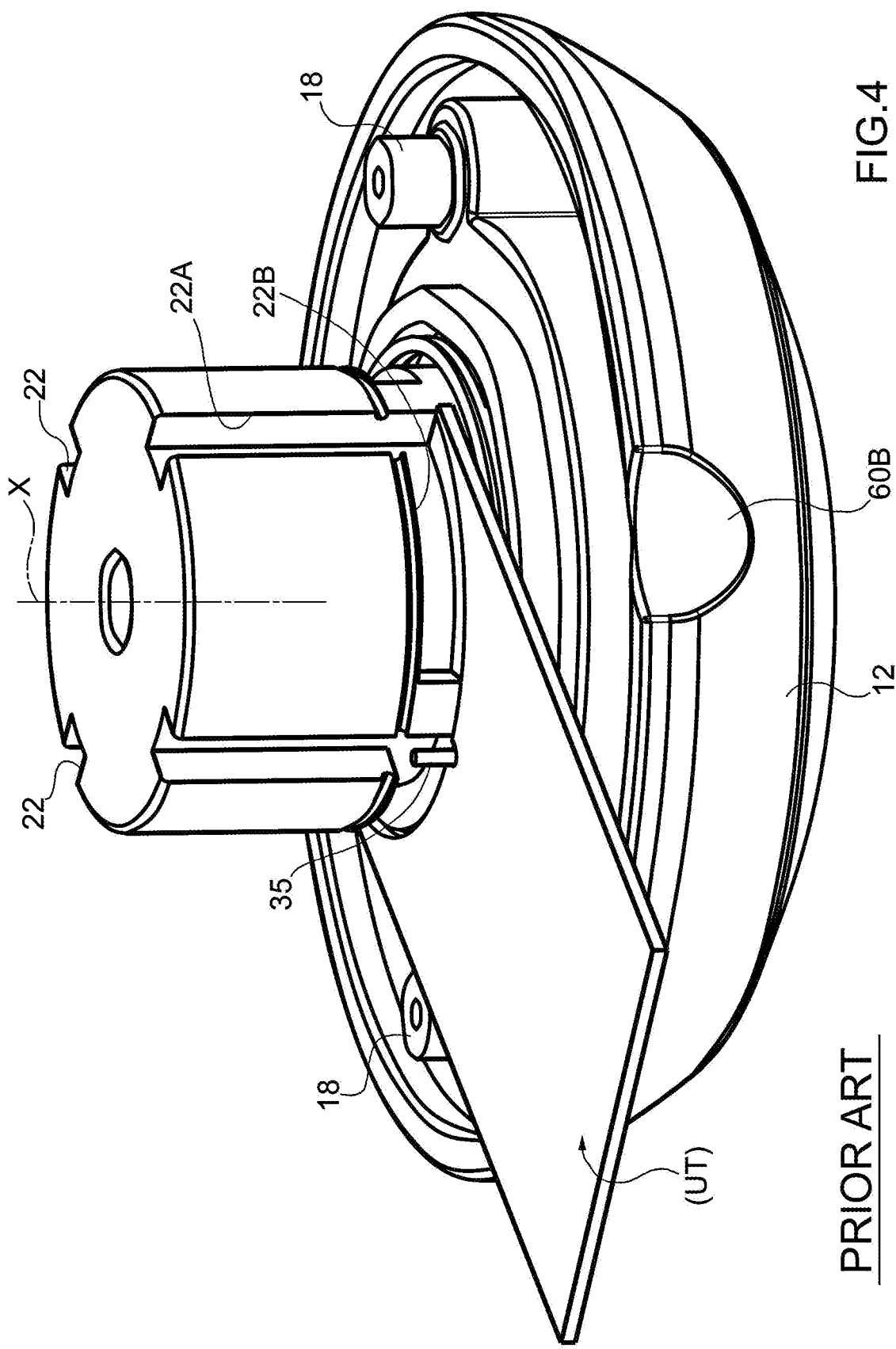
FIG. 4 shows a second coil spring loading step as shown in FIG. 3.
Figure 5:
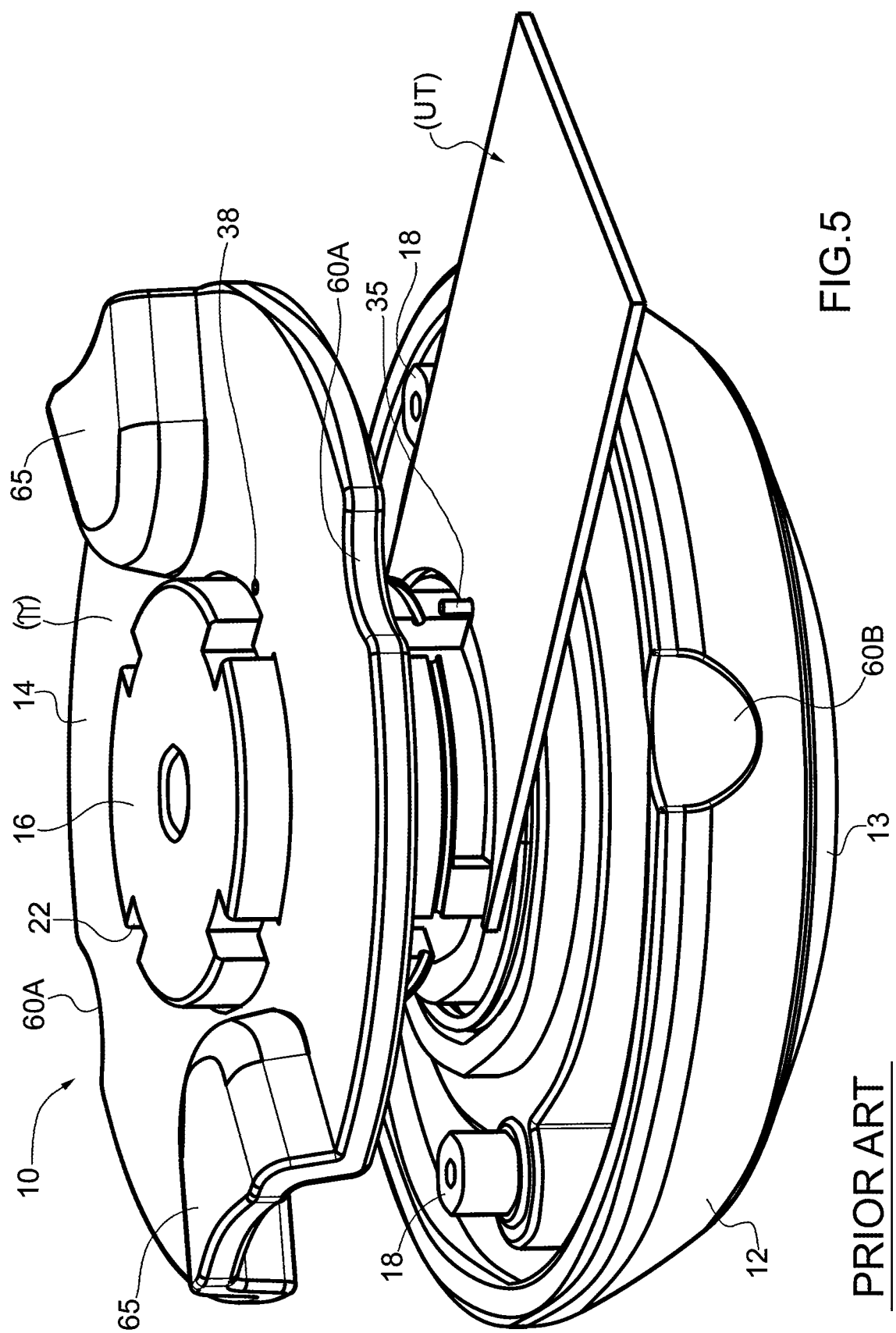
FIG. 5 illustrates a third and final coil spring loading step as shown in FIGS. 3, 4.
Figure 6:
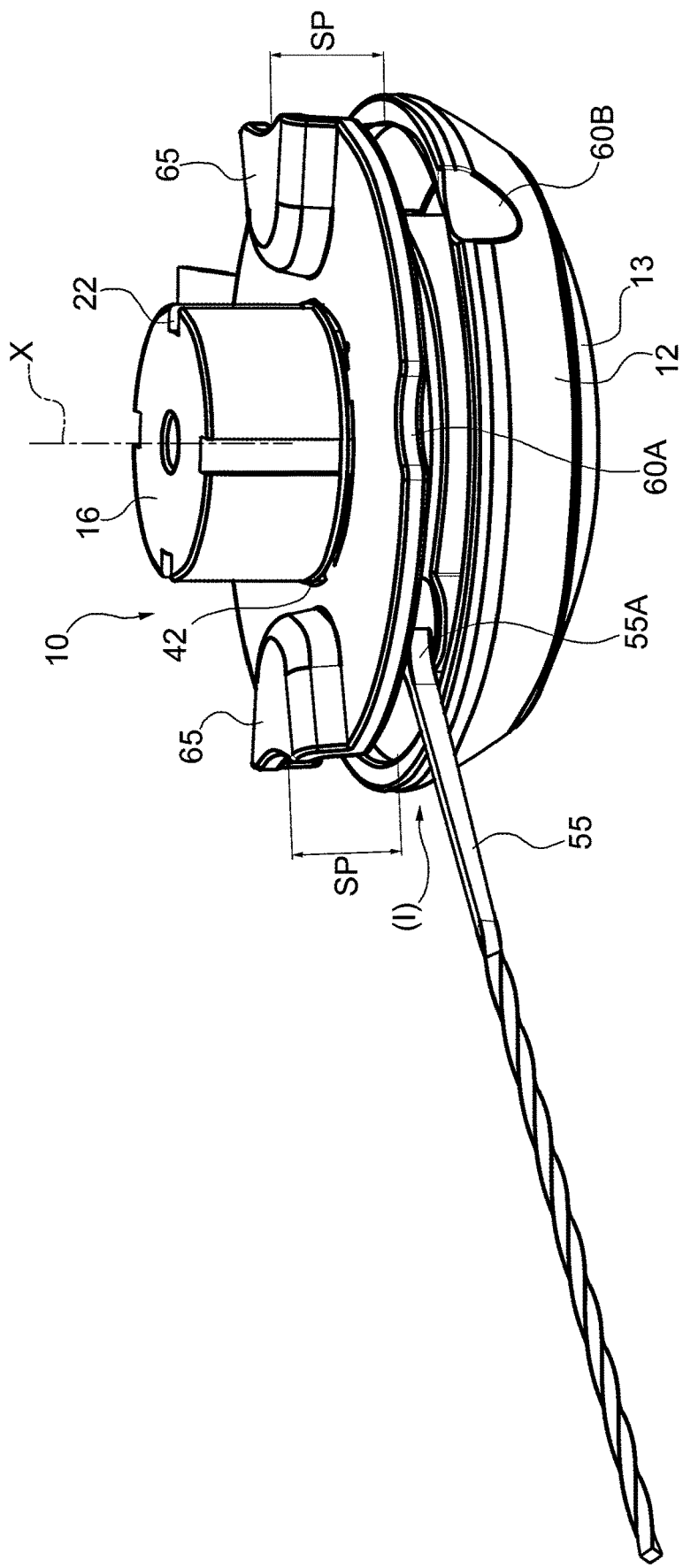
FIG. 6 shows a front perspective view of the rotary head illustrated in FIG. 1-5 in a first working configuration.

With reference to FIGS. 3-8, the mounting of the head 10 will now be described:

1) the cylindrical hub 16 is placed on a positioning tool (not illustrated) to hold it still during assembly operations;

2) the bent lower end section 34 of the coil spring 32 is inserted into the seat 36 provided in the lower shell 12;

3) at this point, the operator must use a particular tool (UT) shown in FIGS. 2-6 made by cutting and shaping a piece of metal sheet; the tool (UT) comprises a main body (MB) of a basically rectangular shape from which a portion has been removed to create an arch (ANS), which copies the circumference of the hub 16, which, in turn, has a central notch (TC);

4) as shown, for example, in FIGS. 3-5 the operator hooks the bent upper end section 35 of the coil spring 32 with the notch (TC) of the tool (UT) and, by twisting this coil spring 32 making it rotate counter-clockwise (about the axis X), inserts the bent upper end section 35 into the above-mentioned seat 38 made on the upper ring nut 14 (FIG. 5); since the arch (ANS) of the tool (UT) has the same curvature radius as the radius of the cylindrical hub 16 and, during the assembly of the head 10, this arch (ANS) is coupled to the external surface of the tool (UT) itself, the tool (UT) is guided by this coupling during its rotation;

5) at the same time, the operator inserts each radial tooth 24 into a corresponding groove 22;

6) once the bent upper end section 35 of the coil spring 32 is coupled to the seat 38 and each radial tooth 24 is coupled to a corresponding second horizontal section 22B the operator pulls the tool (UT) out;

7) at this point, each radial tooth 24 rests on the corresponding end-stop abutment 22C due to the action of the coil spring 32;

8) in other words, when the operator leaves the upper ring nut 14, each radial tooth 24 is free to rotate in the second horizontal section 22B (in the shape of an arc) due to the action performed by the coil spring 32; obviously, the rotation of the tooth 24 stops when the radial tooth 24 itself rests against the corresponding end-stop abutment 22C; at the end the head 10 assumes the configuration illustrated in FIG. 6, i.e. a configuration in which no blade 55 is near a concave portion 65 of the upper ring nut 14; in fact, in this position, the top of the fixed pins 18 rests against corresponding flat surfaces 44 provided on the lower face of the upper ring nut 14 (FIG. 8), so that each cutting blade 55, once assembled on the corresponding fixed pin 18 by means of its eyelet 55A, cannot disengage from the latter; in this case the head 10 is in a first operating configuration (I);

9) at this point the operator inserts the cut-out elastic ring 42 into the seat 16A, effectively locking the upper ring nut 14 to the lower shell 12.

As can be seen from FIGS. 6-8, in the first working configuration (I) of the head 10 between the lower surface 44 of the upper ring nut 14 and the upper surface of the lower shell 12, there is not enough space to remove the cutting blades 55.

In fact, in the first working configuration (I) no cutting blade 55 is located near a concave portion 65.

To pass from the first working configuration (I) to the second blade change configuration (II), the operator only has to tighten the slots 60B with one hand and the upper ring nut 14 with the other hand at the two concave portions 65. The operator then turns the upper ring nut 14 counter-clockwise until the gripping slots 60A are in the same position as the slots 60B.

Figure 9:
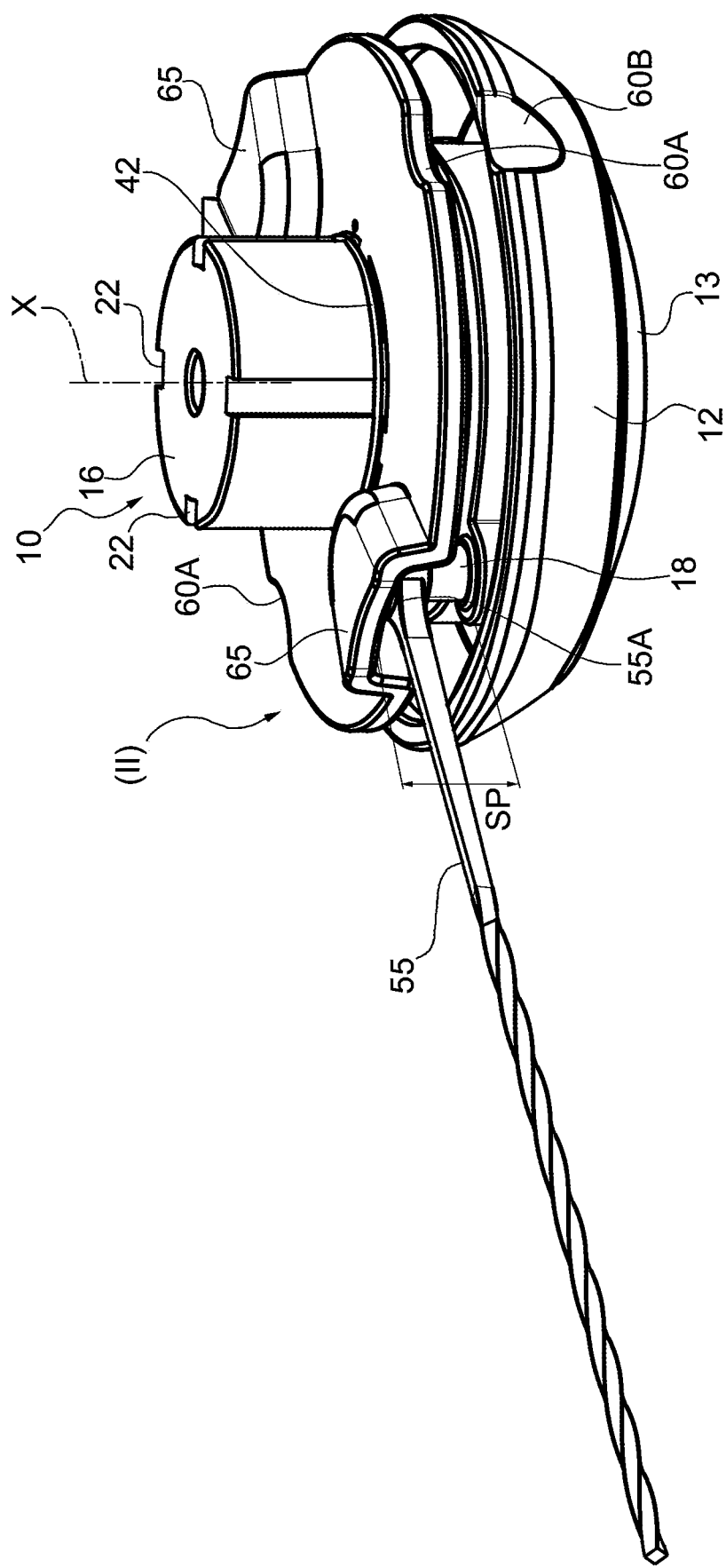
FIG. 9 illustrates a perspective view of the rotary head in FIGS. 1-5 in a second blade change configuration.
Figure 11:
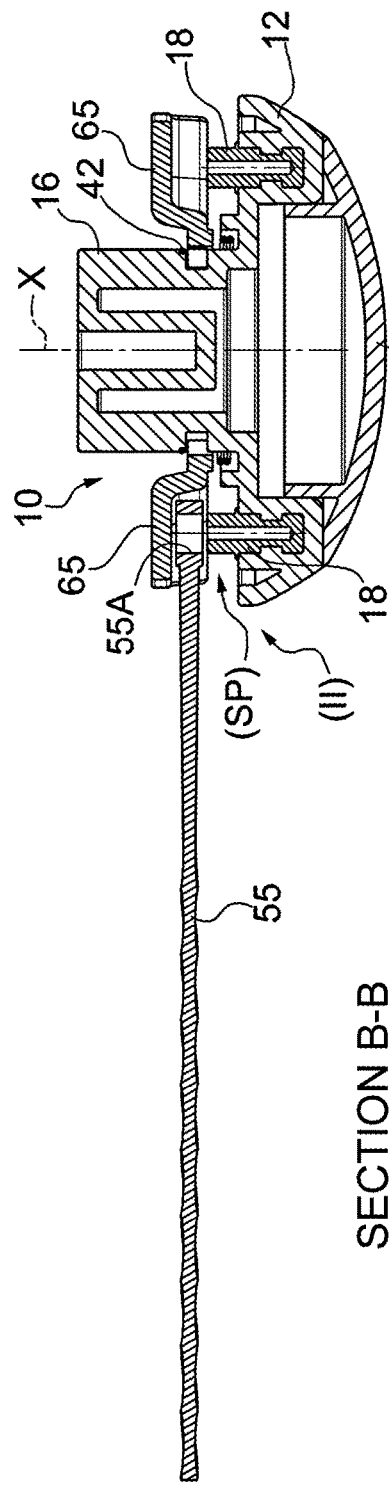
FIG. 11 illustrates a cross-section B-B performed on the view from above in FIG. 10.
Figure 10:
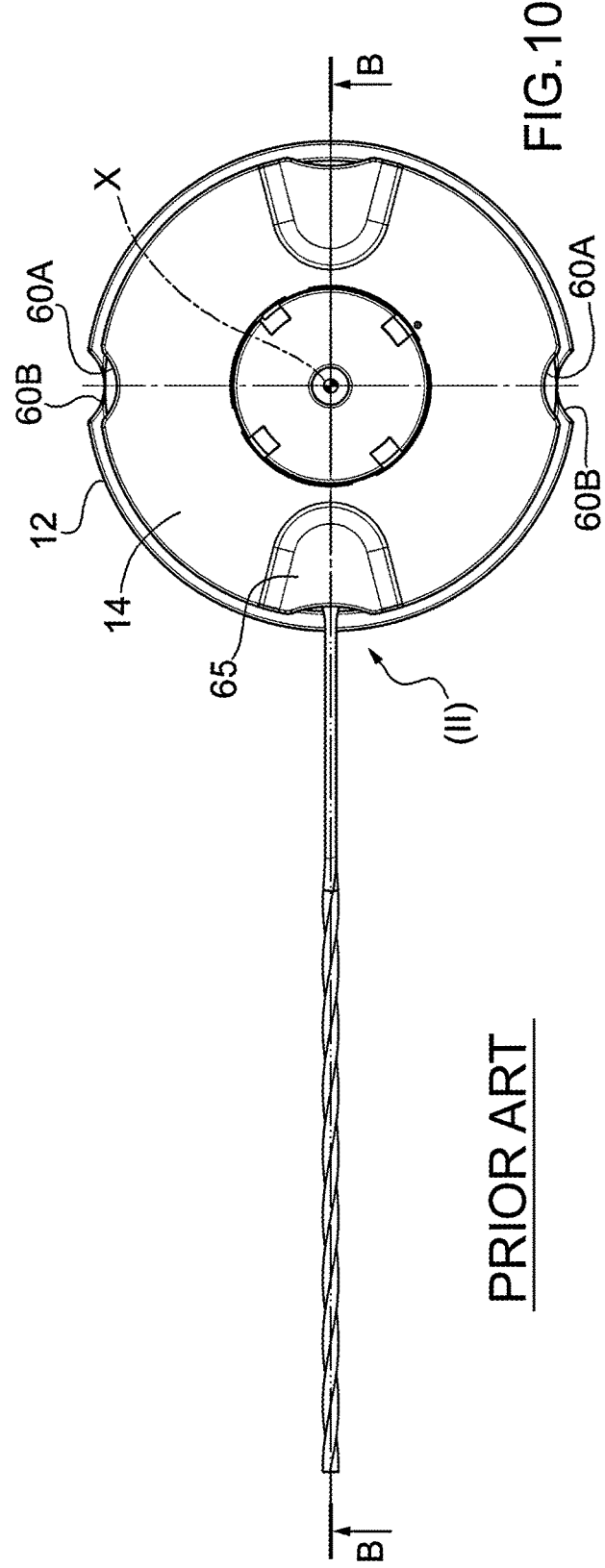
FIG. 10 shows a view from above of the rotary head in FIG. 9.
Figure 17:
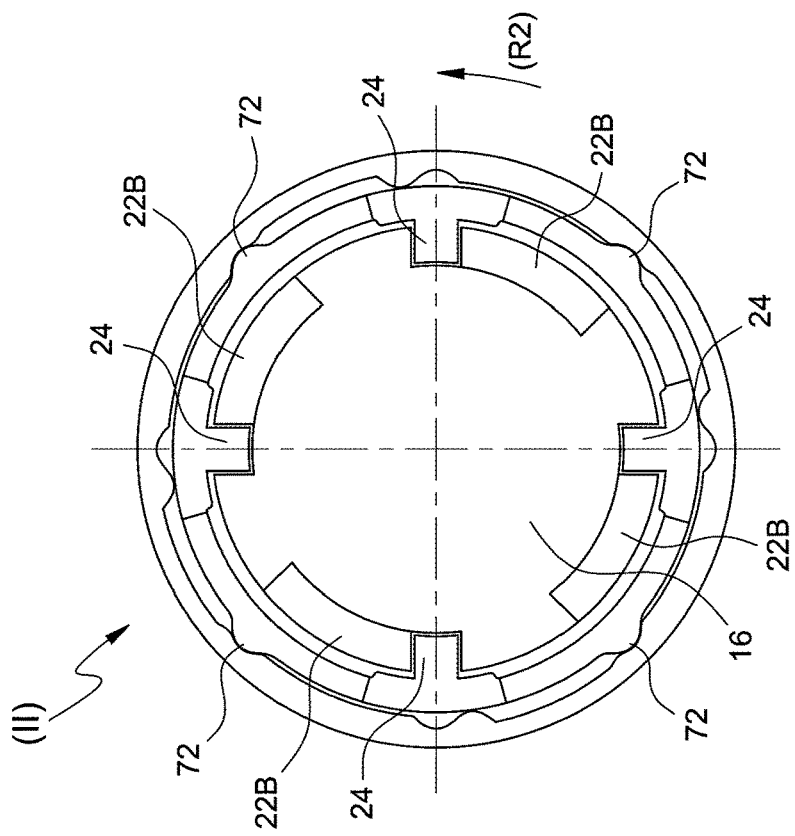
FIG. 17 illustrates a second way of coupling between the two parts illustrated in FIGS. 14 and 15 (blade change configuration)

The second blade change configuration (II) has been fully illustrated in FIGS. 9-11.

In fact, as illustrated in particular in FIG. 11 in the second blade change configuration (II), at least one fixed pin 18, provided with a cutting blade 55, is located just below a concave portion 65 where a space (SP) is created, defined below the concave portion (65) and sufficient to enable the lifting of the cutting blade (55) and its radial removal from the head 10 (FIG. 9).

At this point, and again with the concave portion 65 that is near the fixed pin 18 (and the space (SP)), the operator can quickly perform the blade change by inserting the eyelet 55A of a new blade 55 in the fixed pin 18 and immediately leaving after the upper ring nut 14, which, due to the elastic force carried out by the coil spring 32, returns to the first working configuration (I) shown in FIGS. 6-8.

FIGS. 12-17 illustrate a first embodiment of a rotary head 10I for a brush cutter produced according to the precepts of this invention. This first embodiment of the invention is characterised, among other things, by the fact that it does not have any coil springs.

FIG. 13 illustrates a cross-section of the first embodiment of a rotary head 10I also made according to the precepts of this invention.

As far as possible, in the first embodiment illustrated in FIGS. 12, 13, an attempt was made to keep the same numbering of the elements of the generic head shown in FIGS. 1-11.

Therefore, the same or similar elements will not be described again and must be considered as included in the rotary head 10I.

In this first embodiment between the upper ring nut 14 and the lower shell 12, there is a first inner ring 70 (of axis X), connected to the upper ring nut 14, coupled, in use, to a second outer ring 80 (always of axis X) connected, instead, to the lower shell 12.

In other words, the two rings 70 and 80 are concentric and touch each other in the way that will be described below. The ring 70 is inside the ring 80.

It should also be noted that on the cylindrical hub 16 (FIGS. 16, 17) there are always four grooves 22 (each groove 22 consisting of a first vertical section 22A, followed by a second horizontal section 22B having a corresponding end-stop abutment 22C), while the upper ring nut 14 is always provided with the usual four radial teeth 24 that couple with the grooves 22.

As shown in FIG. 12, each radial tooth 24 (obviously through rotation of the upper ring nut 14 with respect to the lower shell 12) can be moved by the operator from a first position, wherein the radial tooth 24 is located near the first vertical section 22A, to a second position, where the radial tooth 24, as seen, rests against the end-stop abutment 22C.

The upper ring nut 14 is equipped with two concave portions 65 in the shape of a tunnel that is closed at one end in the same way as the generic head illustrated in FIGS. 1-11.

The two rings 70, 80 were shown separately in FIGS. 14 and 15, respectively.

In greater detail, the inner ring 70 comprises an annular main body 71 provided, on the inside, with the above-mentioned four radial teeth 24 (in use engaged with the grooves 22) and, on the outside, with four bulges 72 in the shape of an arc.

The outer ring 80 comprises, in turn, an annular main body 81 with a smooth outer profile 82 and a shaped inner profile 83.

More specifically, the shaped inner profile 83 comprises four first recesses 84, four first protuberances 85, four second recesses 87, and four second protuberances 88. It should be noted that each protuberance 85 is placed next to a respective recess 84 in such a way as to better lock a bulge 72 in a recess 84 (see below). There is a nook between a first protuberance 85 and a second protuberance 88. In total there are, therefore, four nooks 86 (one for each quadrant).

To summarise, for each bulge 72 of the inner ring 70 there are two recess 84, 87. In the space between two recesses 84, 87 there are, therefore, a first protuberance 85, a second protuberance 88, and a nook 86.

It should be noted that the recesses 84, 87 are shaped like an arc with the same curvature radius to accommodate the bulge 72. The first recess 84 is more pronounced than the second recess 87.

In addition, the first protuberance 85 has a greater height than the second protuberance 88 so that, when the bulge 72 is inserted in the first recess 84, and, therefore, the system is in the first working configuration (I) (FIG. 16), there is greater interference between the two rings 70 and 80.

At the same time, each radial tooth 24 rests against the corresponding end-stop abutment 22C.

Figure 16:
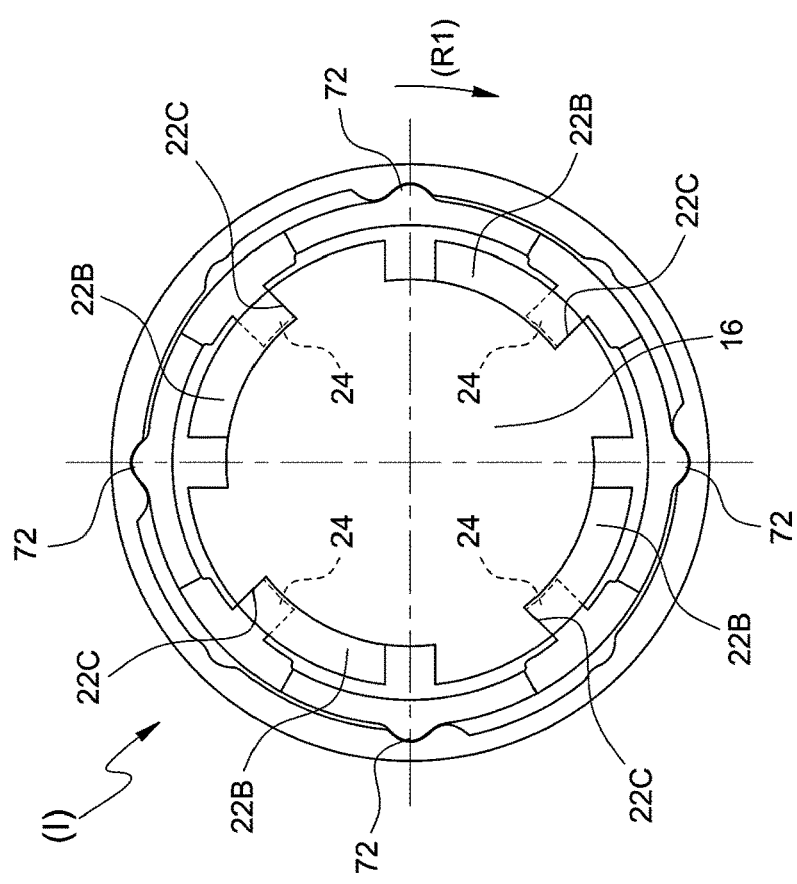
FIG. 16 shows a first way of coupling between the two parts illustrated in FIGS. 14 and 15 (working configuration)

This is what is illustrated in FIG. 16.

On the contrary, when the system assumes the second blade change configuration (II), it is no longer necessary that there be considerable clamping force between the two rings 70, 80, and, therefore, as mentioned above, the second recess 88 may be less pronounced than the first recess 84 because in this system configuration it is no longer necessary that there be strong interference between the two rings 70, 80 themselves.

Therefore, if the operator rotates the inner ring 70 about the axis X in a counter-clockwise direction (R2) (FIG. 17), during the blade change operation, the bulge moves, along a corresponding nook 86, from a first recess 84 to a second recess 88 bypassing a corresponding first protuberance 85 and a corresponding second protuberance 88.

The system passes, therefore, from a first working configuration (I) (FIG. 16) to a second blade change configuration (II) (FIG. 17) simply by manually rotating (in a counter-clockwise direction (R2)) the inner ring 70 (made of a single piece with the upper ring nut 14) in relation to the outer ring 80 (made of a single piece with the lower shell 12).

After having carried out the blade change (FIG. 17), the operator can return the system to the initial working configuration (I) in FIG. 16 by simply rotating the inner ring 70

(and, therefore, the upper ring nut 14) in the clockwise direction (R3) contrary to the rotation (R2).

It should also be noted that when the bulge 72 is inserted in the first recess 84, the radial tooth 24 is found resting against the end-stop abutment 22C (FIG. 16), while when the second recess 87 contains the same bulge 72 (FIG. 17) the radial tooth 24 is located near the portion 22A of the groove 22.

Obviously, the two protuberances 85, 88 can bypass the bulge 72 thanks to the fact that both the lower shell 12 and the upper ring nut 14 are made of elastic materials that can easily be deformed, such as aluminium or its alloys (especially if for professional brush cutters), or of a suitable plastic material, for example the one used to make the known heads.

It should be noted that all elements 72, 24, on the one hand, and 85, 86, 87, 88, on the other hand, are spaced apart from each other so as to allow for the above-mentioned couplings.

In addition, depending on the plastics used, it is possible to provide transverse cuts in the material (not illustrated) on at least one of the two rings 70, 80 in order to increase the pliability of the elements, so that it is not too difficult for an operator to rotate (R2), (R3).

Figure 18:
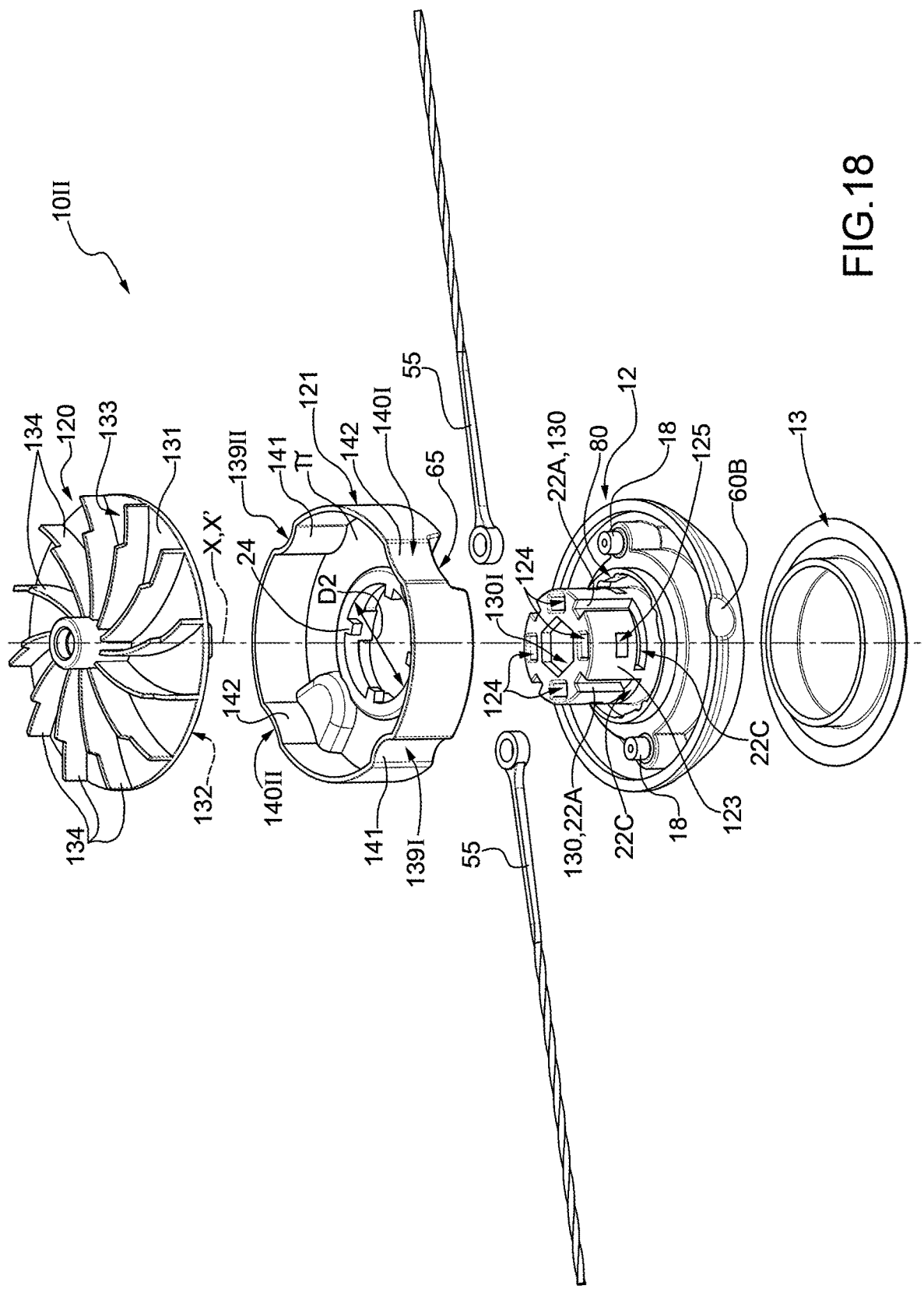
FIG. 18 is a top-down, exploded view of a variant of the rotary head in FIG. 12.
Figure 19:
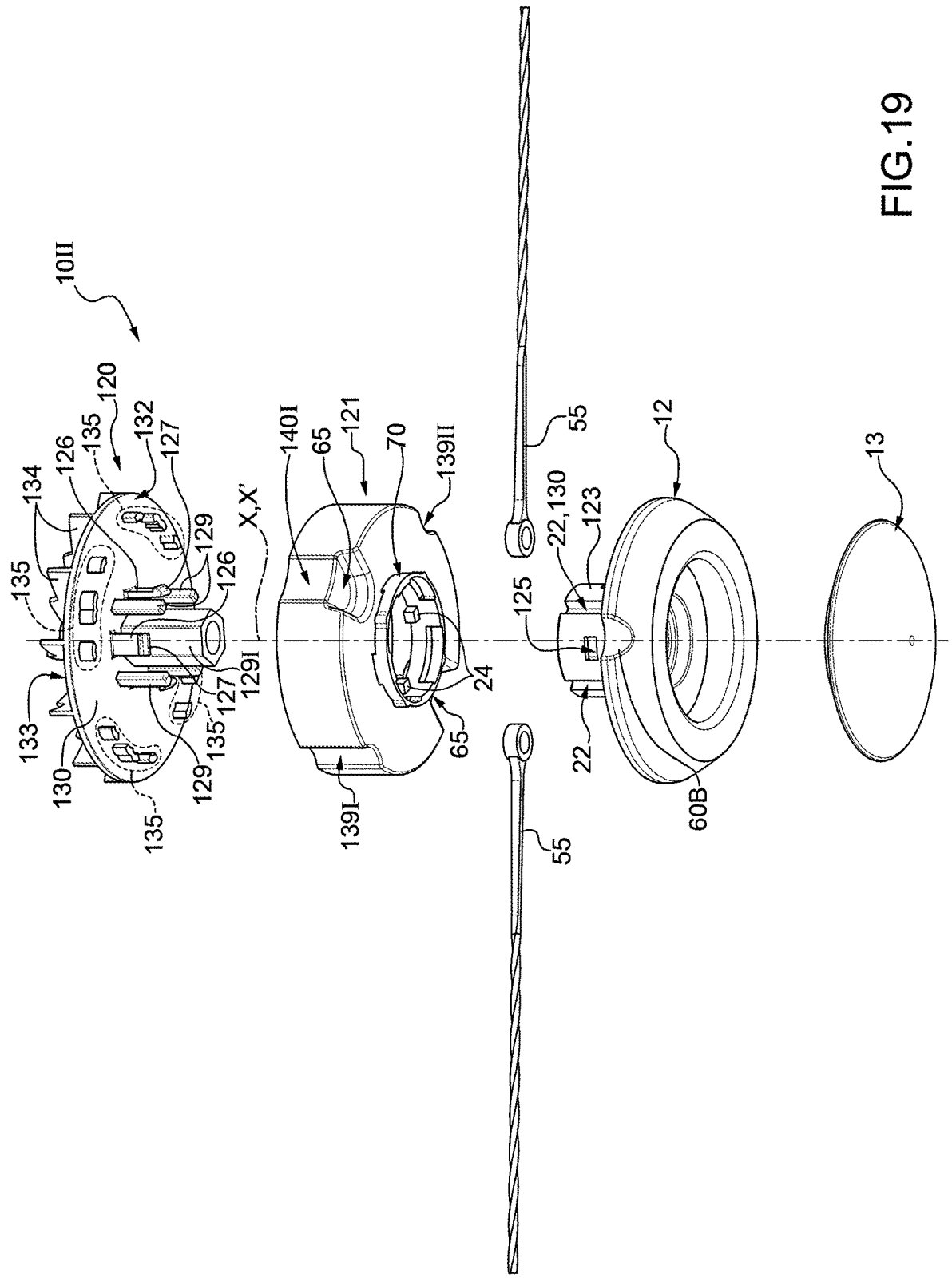
FIG. 19 is an exploded view from the bottom of FIG. 18.

FIGS. 18 and 19 are exploded views from above and, respectively, from the bottom of a second embodiment, indicated with 10II, of the rotary head according to this invention.

The head 10II comprises components in common with the embodiment 10I, these shared components are indicated, herein below and in the figures, with the same numbering and are to be considered as included in the rotary head 10II, without their being mentioned again, for brevity.

In particular, the lower shell 12 is basically the same as described for the embodiment 10I. It should be noted, in particular, that the lower shell 12 also comprises the outer ring 80 as above.

Unlike previous embodiments, the rotary head 10II also comprises a locking body 120. The nut 121, is interposed between the lower shell 12 and the locking body 120. The locking body 120 is a stand-alone body, i.e. it is a separate body from the other elements of the rotary head 10II.

The locking body 120 is configured to be fixed to a drive shaft and/or a hub (not illustrated and of a known type) of a brush cutter and is configured to transmit the rotation to the lower shell 12.

The nut 121 is similar to the nut 14 described above and the shared components maintain the same numbering without renaming them, for brevity. In particular, the nut 121 also comprises the inner ring 70 as described above.

Figure 21:
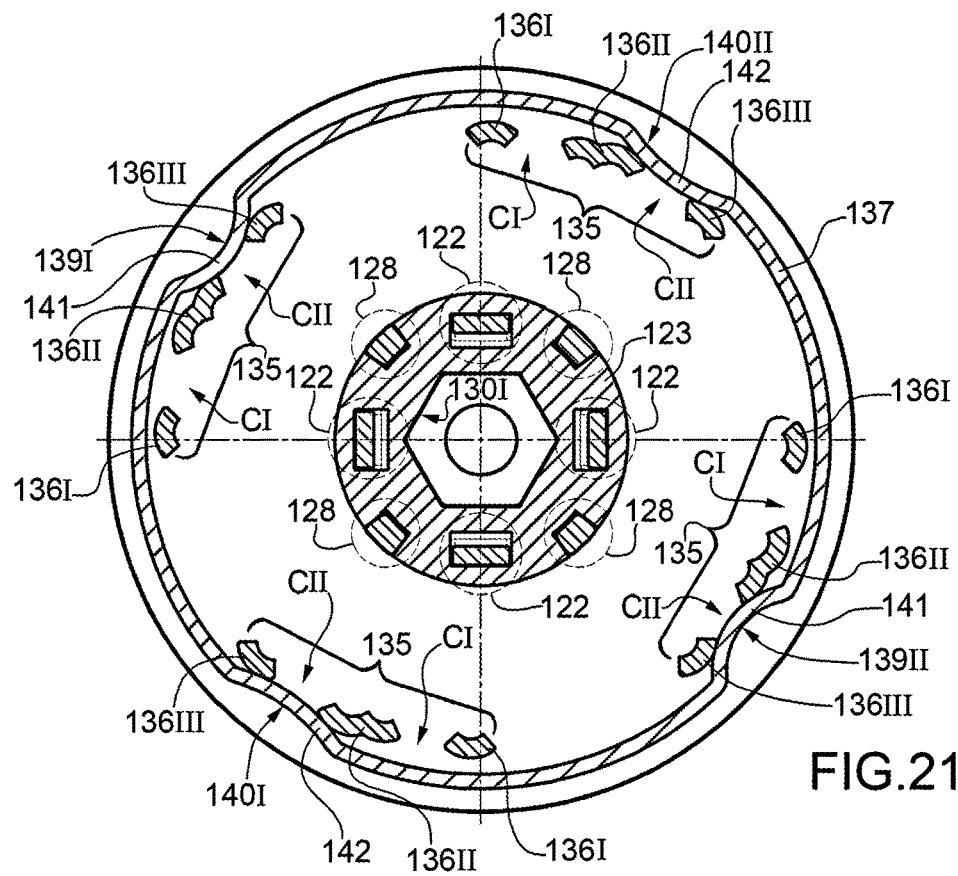
FIG. 21 is a cross-section, on an enlarged scale, along the plane π1 in FIG. 20.
Figure 23:
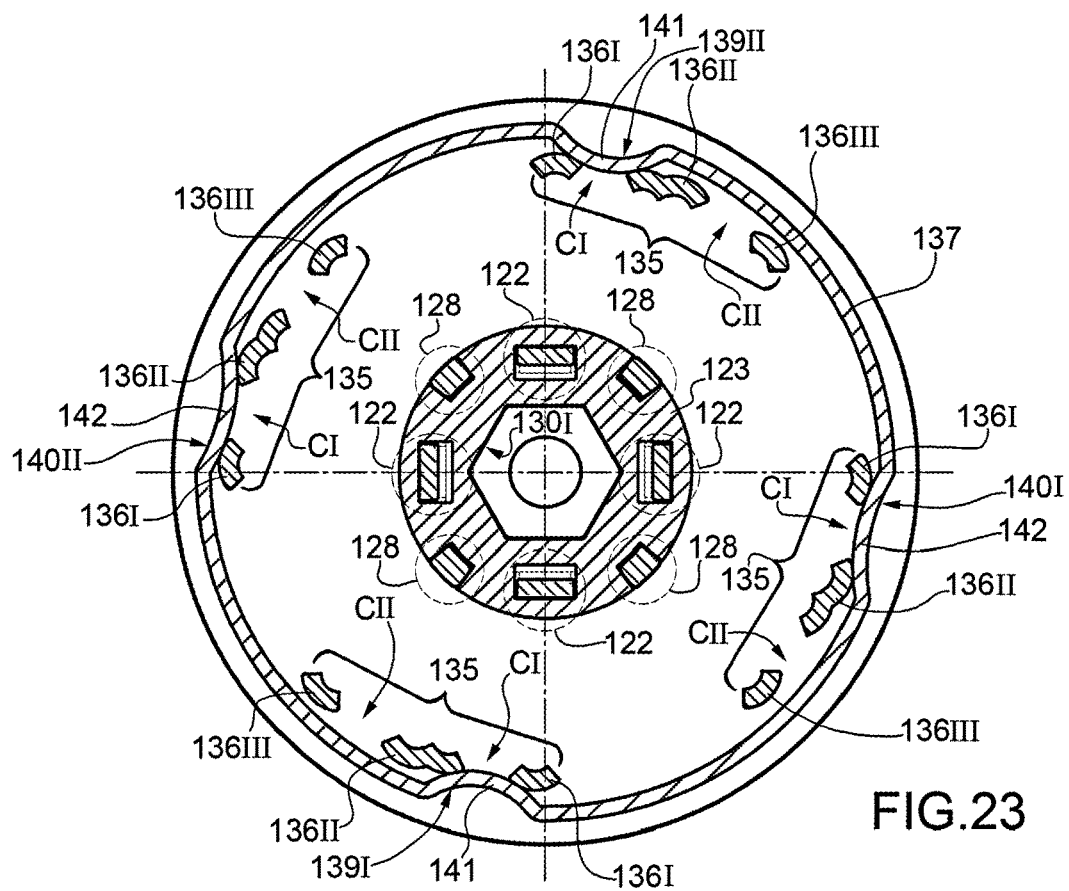

As will be better illustrated below, the locking body 120 is fixed to the lower shell 12, constraining the movement of the nut 121 along the axis X. The locking body 120 prevents the nut 121 from slipping out of the lower shell 12. According to the example illustrated, the locking body 120 is fixed to the lower shell 12 via one or more bayonet couplings 122 (illustrated in cross-section in FIGS. 21 and 23).

Once assembled, the rotary head 10II can, advantageously, only be dismantled once the bayonet couplings 122 have been broken/forced. This improves the safety of the rotary head 10II, which becomes a single body.

The locking body 120 and the lower shell 12 are advantageously coupled together, constraining each other to mutually rotate in a predetermined position about the axis X. This is particularly advantageous for the correct operation of the rotary head 10II, as will be better illustrated below.

According to the example illustrated in FIG. 18, the lower shell 12 comprises a hub 123 that is coaxial to the axis X and one or more channels 124, each of which is basically parallel to the axis X and which radially faces outside the hub 123, at a lower portion (i.e. near the lower shell 12) through a respective radial window 125.

To obtain the bayonet coupling 122, the locking body 120 comprises one or more interlocking bodies 126 (visible in FIG. 19), each of which is inserted, in use, inside a corresponding channel 124 and is configured to fit inside the channel 124 itself interfering with the respective radial window 125. According to the example illustrated, each interlocking body 126 has a projection 127 that is inserted, locking itself inside the corresponding radial window 125.

The use of the bayonet couplings 122 advantageously guarantees the simplicity and speed of assembly, eliminating the risk of error during assembly. According to a variant not shown, the hub 123 comprises the interlocking bodies 126, while the locking body has the channels 124. According to an additional variant not illustrated, the interlocking bodies 126 and the channels 124 are present in both the hub and in the locking body 120.

The locking body 120 and the hub 123 have geometric couplings 128 that make it possible to evenly distribute the torque transmission between the locking body 120 and the lower shell 12, during use, in order to make the rotary motion transfer between the locking body 120 and the lower shell 12 more solid and stable.

According to the example illustrated in FIGS. 18 and 19, the geometric couplings 128 comprise one or more prongs 129 of a first element, each of which engages in a corresponding cavity 130 of a second element. In the example illustrated, the locking body 120 comprises a plurality of prongs 129, each of which is inserted axially into a corresponding cavity 130.

According to a variant not illustrated, the hub comprises the prongs and the locking body the corresponding cavities.

According to an additional variant, the prongs and cavities are present both in the hub and in the locking body.

According to the example illustrated in FIGS. 18 and 19, the cavities 130 correspond to the grooves 22A of the hub.

According to the example illustrated in FIGS. 18 and 19, the locking body 120 comprises a shoulder wall 131 bounded by an internal surface 132, which faces the lower shell 12 in use, and an external surface 133, which faces outwards in use. According to the example illustrated, the interlocking bodies 126 and the prongs 129 protrude from the inner shoulder wall 131.

The shoulder wall 131 is circular, has a longitudinal axis X', which in use is coaxial to the axis X of the lower shell 12. In particular, the hub 123 has a central cavity 130I and a corresponding central prong 129I both having a polygonal base section, hexagonal according to the illustrated example.

The locking body 120 also comprises ribs 134 that protrude from the external surface 133 and are used to disperse the heat of the rotary head 10II during use. The ribs 134 can advantageously be made in different shapes or sizes depending on the type of application. It should be noted that brush cutters from different manufacturers generally differ in the manufacturing form of the ribs 133. Therefore, currently, for each type of brush cutter it is necessary to prepare a corresponding head 10II with the related design/production costs of the moulds. Advantageously, the fact that the locking body 120 is made as a stand-alone body, i.e. a part that can be separated or connected to the other components of the rotary head 10II, makes it possible to adapt the whole rotary head 10II to different applications by simply replacing the locking body 120 with a similar one but with an external geometry, in particular the shape, distribution, and size of the ribs 133, that is compatible with the target brush cutter.

In addition, the locking body 120 advantageously comprises lock-positioning units 135 that protrude from the internal surface 132 of the shoulder wall 131. The interlocking units 135 are radially distributed about the longitudinal axis X' of the shoulder wall 131. The lock-positioning units 135 are configured to interact with the nut 121, as will be better illustrated below.

Each lock-positioning unit 135 comprises, in turn, a plurality of abutment elements 136 configured to create one or more lock positions CI, CII for the nut 121. According to the example illustrated in FIGS. 18 to 23, each lock-positioning unit 135 comprises a central abutment element 136I, interposed between a left abutment element 136I and a right abutment element 136III.

As will be better illustrated below, a housing CI is located between the left abutment element 136I and the central abutment element 136II. A housing CII is located between the central abutment element 136II and the right abutment element 136III.

The left and right abutment elements 361 and 136III are basically curved segments with concavities facing the axis X' of the shoulder wall 131. The central abutment element 136II is an element with double curvature, i.e. having two adjacent curved segments, each element having a concavity facing the axis X' of the shoulder wall.

According to the example illustrated in FIGS. 18 to 23, each nut 121 has, unlike the nut 14 described above, a cup-shaped body bounded by a lateral wall 137.

The extension of the lateral wall 137 along the axis X is basically similar to the distance from the outer ring 80 to the free end of the hub 123.

Therefore, in use, the lateral wall 137 laterally closes the rotary head 10II between the lower shell 12 and the locking body 120.

The nut 121, similarly to the nut 14 described above, has a concave portion 65. The nut 121 has gripping slots 139I and 139II (similar to the gripping slots 60A of the nut 14 described above), which extend longitudinally along the entire lateral wall 137. In addition, the nut 121 has additional gripping slots 140I and 140II, each of which is made at the respective concave portion 65 and extends longitudinally along the entire lateral wall 137.

In particular, each slot 139I, 139II, 140I, 140II is configured to interact, in use, with a corresponding lock-positioning unit 135.

According to the illustrated example, each slot 139I, 139II, 140I, 140II is made by means of a portion of the lateral wall 137 curved towards the inside of the lateral wall 137 itself, i.e. having a concavity facing the outside of the lateral wall 137.

According to the example illustrated, the slots 139I, 139II are each bounded by a portion 141 of the lateral wall 137 and the slots 140I, 140II are each bounded by a portion 142.

The portions 142 have a curvature radius that is greater than the curvature radius of the portions 141.

The nut 121 is fitted to the hub 123 and each radial tooth 24 is assembled so that it slides inside the corresponding groove 22 by rotating the nut 121 clockwise or counter-clockwise. The extension of the groove 22 determines the maximum rotation that the nut 121 can make in one direction or in the other. In other words, the ends of the groove 22 constrain the rotation of the nut 121 about the hub 123.

The locking body 120 is coupled to the hub 123 of the lower shell 12 so that the free ends of the slots 139I, 139II, 14II, 14III are each placed in contact with a corresponding lock-positioning unit 135. Advantageously, the bayonet couplings 122 and the geometric couplings 128 between hub 123 and locking body 120 make it possible for the lock-positioning units 135 to be arranged in a predefined angular position in relation to the portions 141 and 142 of the lateral wall 137. In particular, once the locking body 120 has been coupled to the hub 123, each portion 141, 142 is rotated about the longitudinal axis X along a predefined path by the lock-positioning unit 135. According to the example illustrated, each portion 141, 142 is mobile from the housing CI (CII) of a lock-positioning unit 135 to the housing CII (CI) of the adjacent lock-positioning unit 135, and vice versa. As mentioned above, the rotation of the nut 121 about the hub 123 is constrained by the interaction of the radial teeth 24 with the horizontal, semi-circular section 22c of the groove 22.

In addition to delimiting the housings CI and CII, the abutment elements 136 advantageously serve as trip elements, so that the resistance exerted by the abutment elements 136 against the corresponding portion 141, 142 must be overcome in order to rotate the nut 121 to move the portions 141 and 142 from one housing CI (CII) to the other CII (CI). This resistance is mainly overcome by the elasticity of the material of which the nut 121 is made.

The nut 121 is advantageously made of an elastic material, in particular a polymeric material.

In use, when a concave portion 65 is placed at a respective prong 18 (FIG. 20), a cutting blade 55 can be inserted or replaced in a similar way to that described above. In this position, each portion 141, 142 is locked inside a housing CII of a corresponding lock-positioning unit 135. According to the example illustrated, by rotating the nut 121 clockwise to lock the blade 55, each portion 141, 142 is brought into the housing C1 of the adjacent lock-positioning unit 135.

Advantageously, the presence of the lock-positioning units 135 between the locking body 120 and the nut 121 means that the positioning of the nut 121 can be made more stable and safe during use, ensuring that the blade 55 does not unintentionally slip out.

From the above, thanks to the speed and simplicity with which it is possible to replace the cutting means in the rotary head 10I, 10II, the subject of this invention, the operator is encouraged to replace them in order to use the most suitable cutting means for a certain specific use (for example cutting means suitable for normal grass cutting, or specific for tenacious weeds, or of the type for grass near obstacles).

The invention claimed is:

1. A rotary head for brush cutters comprising:
a lower shell having a rotation axis and comprising one or more pins, each of which is configured to hinge, in use, a respective blade;
wherein the lower shell comprises a hub, which is configured to be rotated about said rotation axis; said hub having a plurality of respective grooves;
wherein the rotary head comprises a ring nut and does not engage with a spring wherein the ring nut comprises a plurality of radial teeth, each of the plurality of radial teeth being inserted within a respective groove of said hub; the ring nut being rotatable about the rotation axis from a first working configuration to a second blade-change working configuration, and vice versa;
wherein the rotary head comprising positioning units for interference fitting said ring nut in a predetermined angular position relative to said lower shell;
wherein one or more positioning units are between the ring nut and the lower shell; wherein said positioning units between the ring nut and the lower shell comprise a first inner ring, connected to said ring nut, and a second outer ring connected to said lower shell;

wherein said inner ring comprises an annular main body, which is provided, on the inside, with radial teeth and, on the outside, with a plurality of bulges; and wherein said outer ring comprises an annular main body having a smooth outer profile and a shaped inner profile; said shaped inner profile being configured to be engaged by said bulges of said inner ring.

2. The rotary head according to claim 1, wherein said positioning units are made of polymeric material.

3. The rotary head according to claim 1, characterized in that said shaped inner profile comprises a first plurality of recesses and a second plurality of recesses configured to be engaged by said bulges; wherein, when the ring nut is in the first working configuration said bulges are engaged with said first plurality of recesses; when the ring nut is in the second working configuration said bulges are engaged with said second plurality of recesses.

4. The rotary head according to claim 3, wherein between each first recess and each second recess adjacent to each other there are a first protuberance and a second protuberance.

5. The rotary head according to claim 4, wherein between each first protuberance and each second protuberance adjacent to each other there is a nook.

6. The rotary head according to claim 1 and comprising a locking body;

wherein the ring nut is interposed along the rotation axis between the locking body and the lower shell;

wherein the locking body is fixed to the hub of the lower shell and is axially and rotatably attached to said hub; and wherein one or more positioning units are between the ring nut and the locking body.

7. The rotary head according to claim 6, wherein the locking body comprises a shoulder wall having an internal surface facing said ring nut;

wherein the rotary head comprises one or more positioning units, which protrudes from said internal surface; and wherein said lateral wall has one or more joint portions configured to interfere with one or more positioning units.

8. The rotary head according to claim 7, wherein each positioning unit comprises a plurality of abutment elements, which protrude from said internal surface;

wherein the abutment elements are radially distributed one in relation to the another to create a plurality of housings for said joint portions of the ring nut; and wherein said joint portions are movable from one housing to the another sliding on said beat elements.

9. The rotary head according to claim 1, wherein said ring nut comprises at least one concave portion shaped so as that:

when said concave portion is in the first working configuration, between said ring nut and said lower shell there is not enough space to permit the manual lifting and removal of said blade, when said concave portion is in the second working configuration, between said ring nut and said lower shell there is a space that is such as to permit the insertion or replacement of the blade.

10. A rotary head for brush cutters comprising:

a lower shell having a rotation axis and comprising one or more pins, each of which is configured to hinge, in use, a respective blade;

wherein the lower shell comprises a hub which is configured to be rotated about said rotation axis; said hub having a plurality of respective grooves;

wherein the rotary head comprises a ring nut and does not engage with a spring, the ring nut being rotatable about the rotation axis from a first working configuration to a second blade-change working configuration, and vice versa;

wherein the rotary head comprising positioning units for interference fitting said ring nut in a predetermined angular position relative to said lower shell;

wherein one or more positioning units are between the ring nut and the lower shell; and wherein said positioning units between the ring nut and the lower shell comprise a first inner ring connected to said ring nut and a second outer ring connected to said lower shell.

11. The rotary head according to claim 10, wherein said positioning units are made of polymeric material.

12. The rotary head according to claim 10, wherein the rotatory head does not slide along a longitudinal axis of the hub.

13. The rotary head according to claim 10 comprising:

a locking body;

wherein the ring nut is interposed along the rotation axis between the locking body and the lower shell;

wherein the locking body is fixed to the hub of the lower shell and is axially and rotatably attached to said hub; and wherein the one or more positioning units are between the ring nut and the locking body.

14. The rotary head according to claim 1, wherein the rotatory head does not slide along a longitudinal axis of the hub.

* * * * *